United States Patent [19]
Heller et al.

[11] Patent Number: 5,390,427
[45] Date of Patent: Feb. 21, 1995

[54] FASTENER MEASURING DEVICE

[76] Inventors: David W. Heller; Melanie L. Heller, both of 616 Rugby Rd., Phillipsburg, N.J. 08865

[21] Appl. No.: 58,030
[22] Filed: May 10, 1993
[51] Int. Cl.⁶ .............................................. G01B 5/00
[52] U.S. Cl. ........................................ 33/811; 33/810
[58] Field of Search ................. 33/810, 783, 806, 811, 33/812, 483, 484, 485, 488, 600, 562; 362/23, 29, 30, 119, 120

[56] References Cited

U.S. PATENT DOCUMENTS

| | | | |
|---|---|---|---|
| 1,958,024 | 5/1934 | Stowell | 33/810 |
| 2,241,691 | 5/1941 | Williams | 33/484 |
| 2,554,854 | 5/1951 | Chomes | 362/23 |
| 2,675,617 | 4/1954 | Goldman et al. | 33/811 |
| 2,736,097 | 2/1956 | Coleman, Jr. | 33/488 |
| 2,799,942 | 7/1957 | Ehler | 33/810 |
| 2,908,081 | 10/1959 | Burke, Jr. | 33/488 |
| 4,138,820 | 2/1979 | O'Connor | 33/562 |
| 4,726,121 | 2/1988 | Ray et al. | 33/806 |
| 5,025,567 | 6/1991 | McWilliams et al. | 33/366 |
| 5,131,162 | 7/1992 | Miller | 33/562 |

*Primary Examiner*—Christopher W. Fulton
*Attorney, Agent, or Firm*—E. Michael Combs

[57] ABSTRACT

An elongate handle mounts a support plate, with the support plate including a slide plate arranged in a sliding coaxial relationship along the support plate relative to the handle, with the support plate having a first fixed jaw and a second movable jaw displaceable along the support plate, with the slide plate having an indicator lug arranged for indication of a fastener size positioned between the jaws, as indicated, upon one of a plurality of scales on opposed sides of the indicator lug.

4 Claims, 4 Drawing Sheets

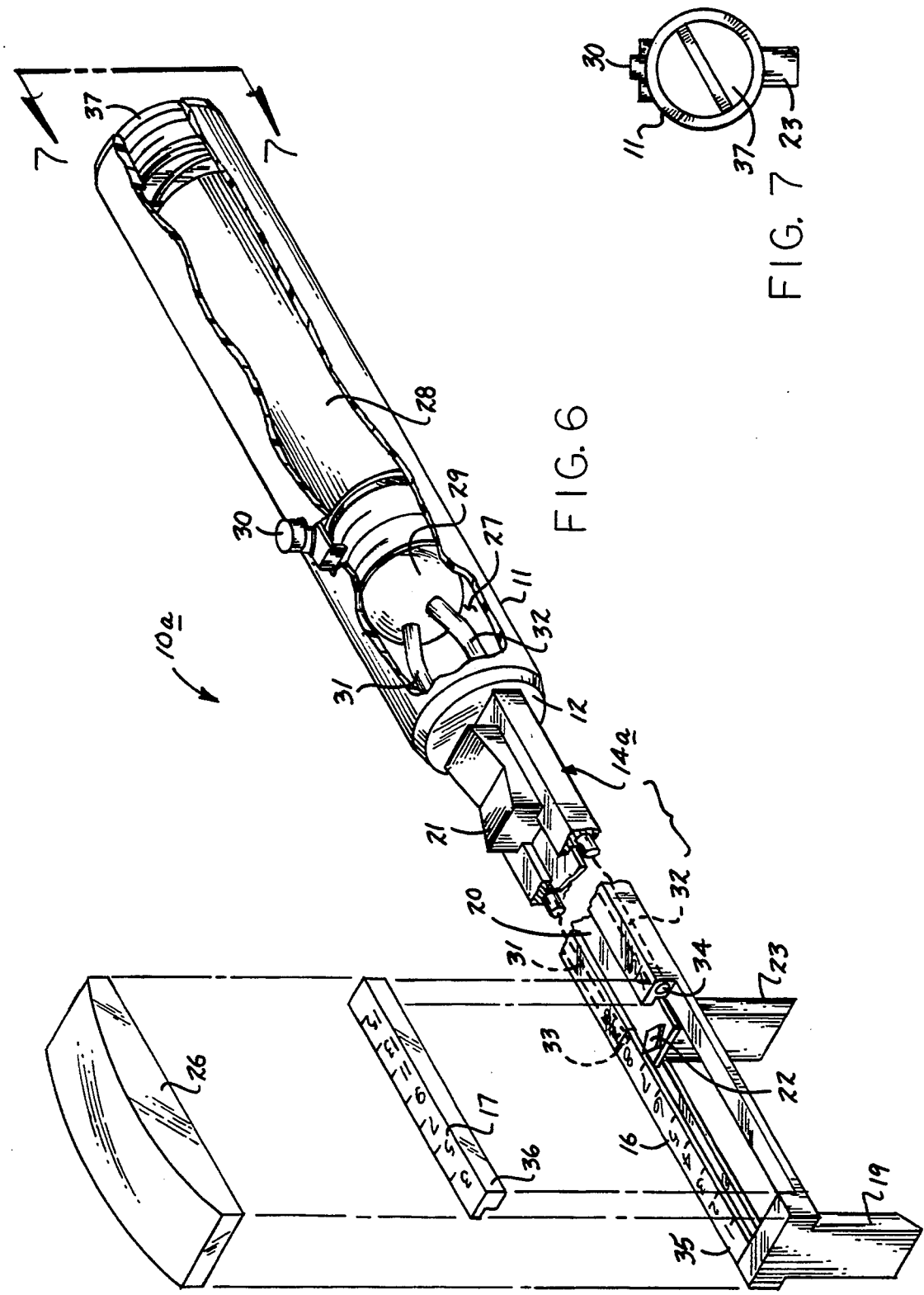

FASTENER MEASURING DEVICE

BACKGROUND OF THE INVENTION

1. Field of the Invention

The field of invention relates to measuring apparatus, and more particularly pertains to a new and improved fastener measuring device wherein the same is arranged to provide for ease of indication of fastener size to permit individuals to employ the correct tool for association therewith.

2. Description of the Prior Art

Measuring devices of various types are indicated in the prior art as exemplified by the U.S. Pat. No. 4,393,601; 3,762,057; 3,815,598; and 4,485,556.

The instant invention attempts to overcome deficiencies of the prior art by providing for a convenient and simplified organization permitting ease of measurement of a fastener prior to its use and in this respect, the present invention substantially fulfills this need.

SUMMARY OF THE INVENTION

In view of the foregoing disadvantages inherent in the known types of measuring apparatus now present in the prior art, the present invention provides a fastener measuring device employing cooperative jaws to receive a fastener therebetween for simultaneous indication of such fastener sizing. As such, the general purpose of the present invention, which will be described subsequently in greater detail, is to provide a new and improved fastener measuring device which has all the advantages of the prior art measuring apparatus and none of the disadvantages.

To attain this, the present invention provides an elongate handle mounting a support plate, with the support plate including a slide plate arranged in a sliding coaxial relationship along the support plate relative to the handle, with the support plate having a first fixed jaw and a second movable jaw displaceable along the support plate, with the slide plate having an indicator lug arranged for indication of a fastener size positioned between the jaws, as indicated, upon one of a plurality of scales on opposed sides of the indicator lug.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fastener measuring device which has all the advantages of the prior art measuring apparatus and none of the disadvantages.

It is another object of the present invention to provide a new and improved fastener measuring device which may be easily and efficiently manufactured and marketed.

It is a further object of the present invention to provide a new and improved fastener measuring device which is of a durable and reliable construction.

An even further object of the present invention is to provide a new and improved fastener measuring device which is susceptible of a low cost of manufacture with regard to both materials and labor, and which accordingly is then susceptible of low prices of sale to the consuming public, thereby making such fastener measuring devices economically available to the buying public.

Still yet another object of the present invention is to provide a new and improved fastener measuring device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the invention employing a modified support plate structure for use with illumination.

FIG. 7 is an orthographic view, taken along the lines 7—7 of FIG. 6 in the direction indicated by the arrows.

DESCRIPTION OF THE PREFERRED EMBODIMENT

Figure 1:
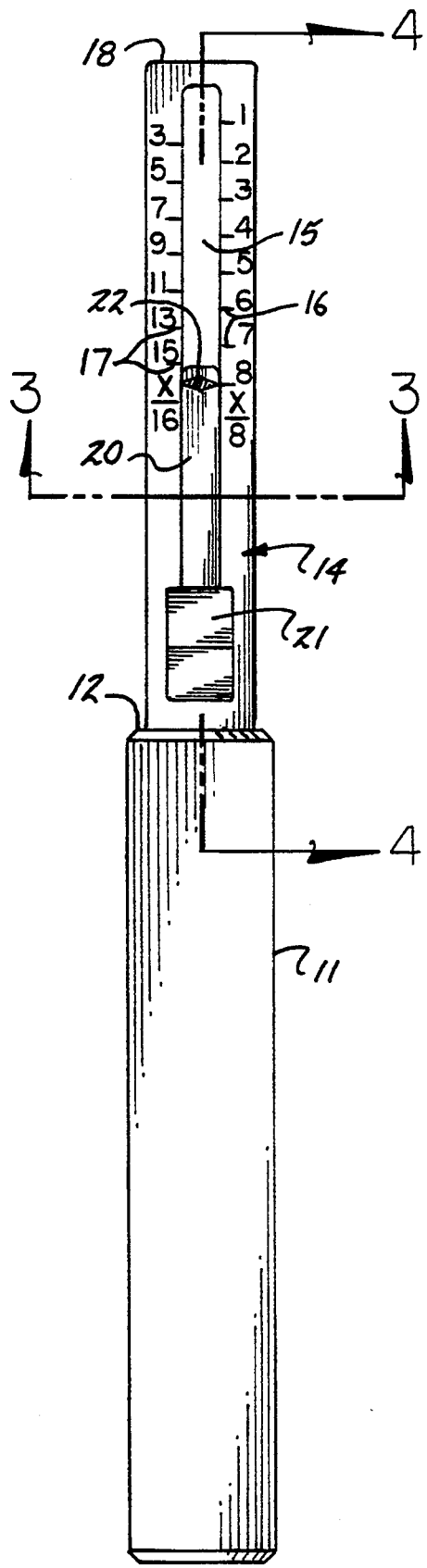
FIG. 1 is an orthographic rear view of the invention.
Figure 2:
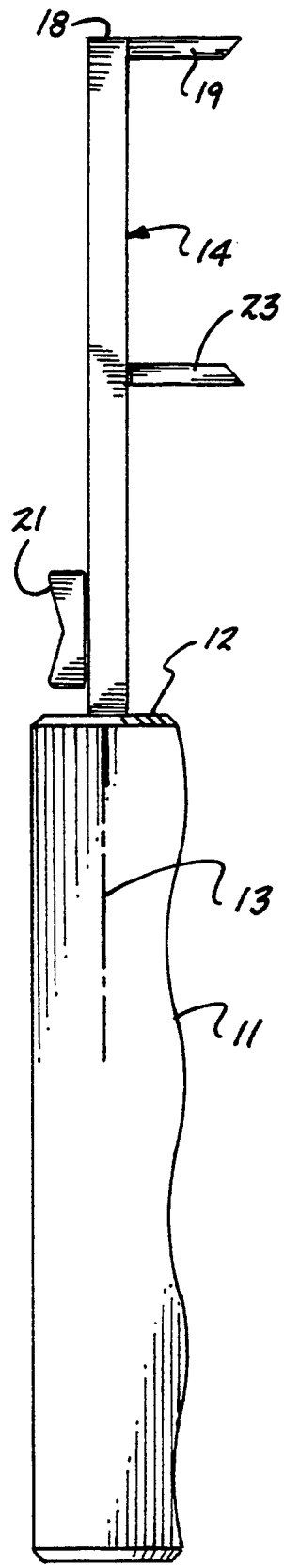
FIG. 2 is an orthographic side view of the invention.
Figure 3:
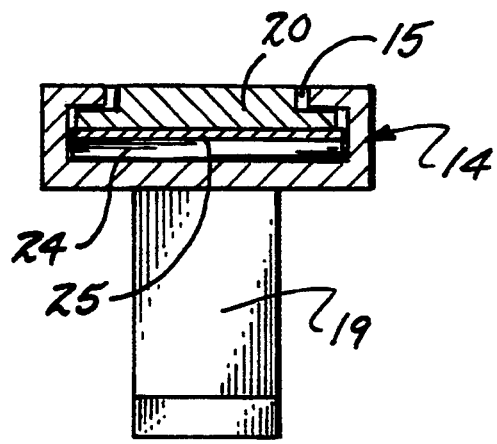
FIG. 3 is an orthographic view, taken along the lines 3—3 of FIG. 1 in the direction indicated by the arrows.
Figure 4:
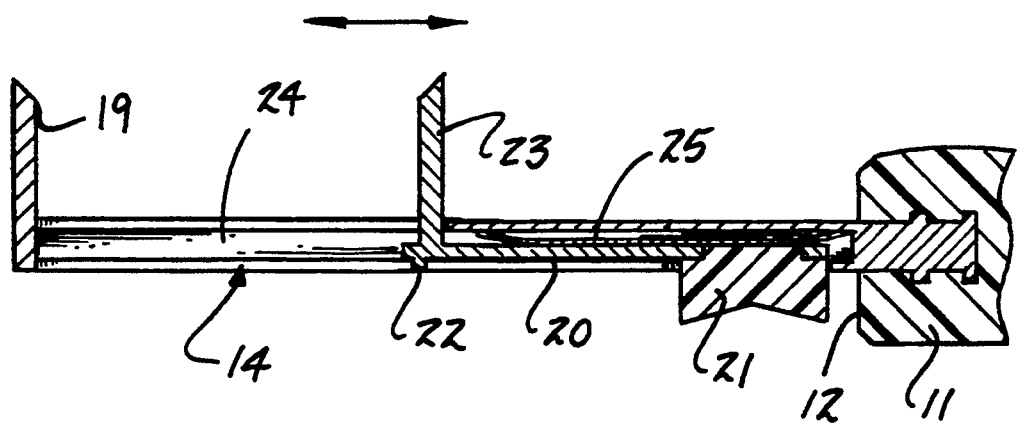
FIG. 4 is an orthographic view, taken along the lines 4—of FIG. 1 in the direction indicated by the arrows.

With reference now to the drawings, and in particular to FIGS. 1 to 7 thereof, a new and improved fastener measuring device embodying the principles and concepts of the present invention and generally designated by the reference numerals 10 and 10a will be described.

More specifically, the fastener measuring device 10 of the instant invention essentially comprises an elongate handle 11, having a handle end wall 12 orthogonally oriented relative to an axis 13 about which the handle 11 is symmetrically configured. A support plate 14 coaxially aligned along the axis 13 mounted fixedly to the end wall 12 is provided, having a central slot 15, with respective first and second reference indicia 16 and 17 positioned on opposed sides of the central slot 15 to a first side of the support plate 14. The support plate 14 is provided with a support plate free end 18 spaced from the end wall 12, having a fixed jaw 19 orthogonally mounted to the support plate at the support plate free end 18 to a second side of the support plate. A slide plate 20 is mounted within a generally T-shaped track 24, to include the central slot 15, with a movable jaw 23 fixedly and orthogonally mounted to the slide plate 20 projecting from the second side of the support plate in a facing parallel relationship relative to the fixed jaw 19. An indicator lug 22 is mounted to a first end of the slide plate 20, with a slide plate boss 21 mounted to a second end of the slide plate 20 to provide for ease of manual displacement of the slide plate within the T-shaped slot, with the indicator lug 22 oriented within the central slot 15, as indicated. The T-shaped track 24 includes a spring plate 25 oriented between the slide plate 20 and the support plate 14 within the T-shaped track 24 to maintain positioning of the slide plate within the T-shaped track structure.

In this manner, a fastener positioned between the fixed and movable jaws 19 and 23 respectively is positioned such that the movable jaw is directed towards the fixed jaw employing the slide plate boss 21 to direct the slide plate 20 within the slot 15. The indicator lug 22 is positioned between the first and second referenced indicia 16.and 17. Typically, the first and second referenced indicia are in respective inches and millimeters of reference for indicating to individuals the specific sizing of the fastener and thereby indicating the type of tool structure to be used, such as a correct socket sizing. To this end, the referenced indicia may be based upon the exact size of the fastener or alternatively, upon the size of socket and the like required for use with the fastener as desired by an individual.

Figure 5:
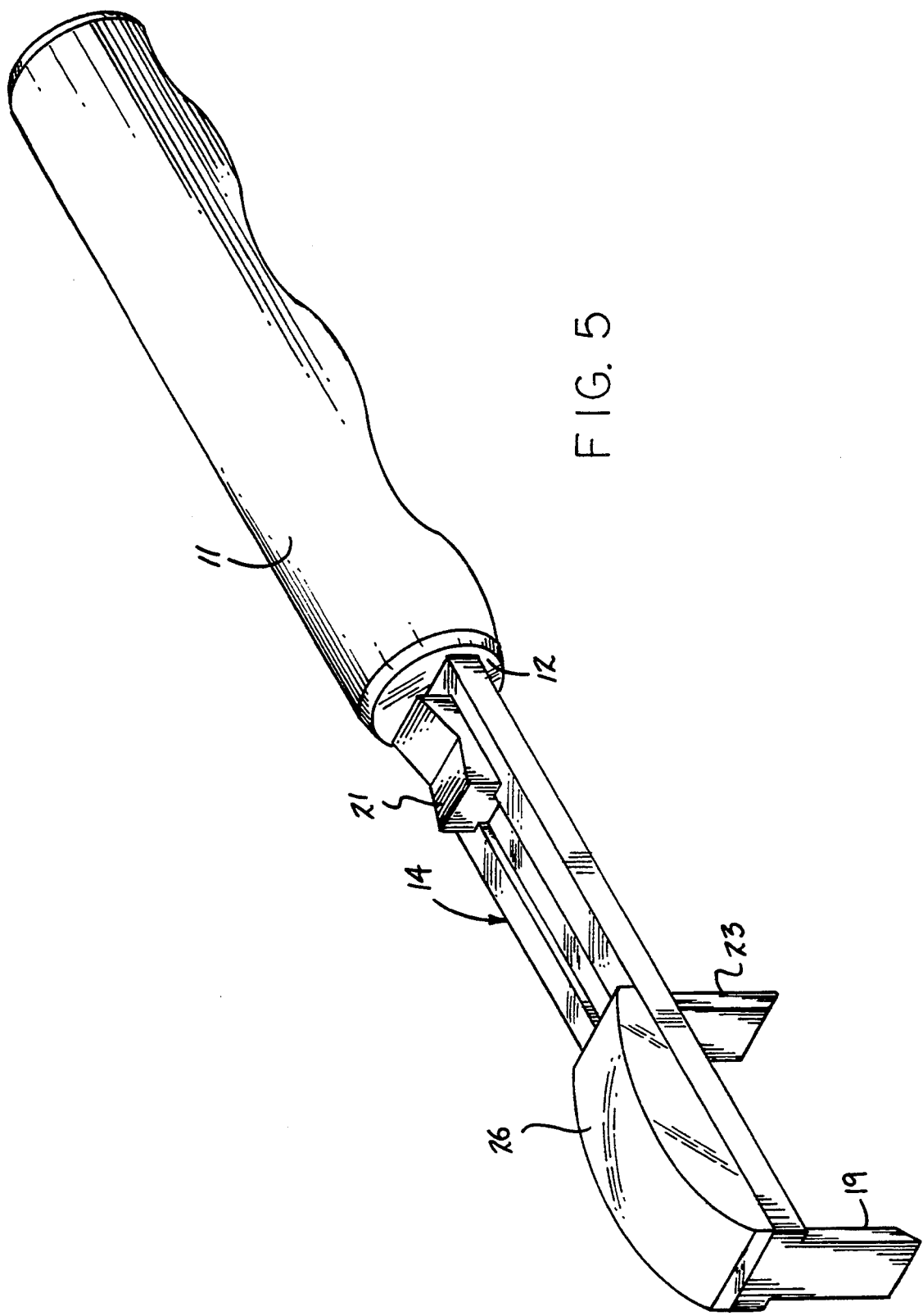
FIG. 5 is an isometric illustration of the invention employing a magnification lens.

The FIG. 5 indicates the structure to further include a magnification lens 26 extending over the slot 15 and coextensive with the first and second referenced indicia 16 and 17 to the first side of the support plate 14 for enhanced viewing of the support plate.

The device 10a, as indicated in the FIGS. 6 and 7, is arranged to further include a handle cavity 27, having a battery member 28 therewithin cooperative with an illumination bulb 29 through a pressure switch 30 mounted and projected through the handle 11, whereupon grasping of the handle 11 effects illumination of the bulb 29 through the battery member 28. A housing end cap 37 permits ease of replacement and maintenance of components within the handle. First and second fiber optic cables 31 and 32 are directed through the handle end wall 12, with first and second cable first ends respectively positioned in a facing relationship relative to the illumination bulb to direct illumination through the fiber optic cables, with the fiber optic cables extending through the support plate and terminating in respective first and second cable second ends 33 and 34 respectively, with respective first and second transparent inserts 35 and 36 arranged in a longitudinally aligned facing relationship relative to the respective first and second cable second ends 33 and 34 to direct illumination through the respective first and second transparent inserts 35 and 36 that respectively include the first and second referenced indicia 16 and 17 thereon. In this manner, the first and second transparent inserts 35 and 36 are illuminated with ease of viewing of the indicia by the magnification lens 26 mounted over the first and second transparent inserts 35 and 36, in a manner as indicated in FIG. 6.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fastener measuring device, comprising,
   an elongate handle symmetrically oriented about an axis, wherein the handle includes an end wall, the end wall having a support plate fixedly mounted to the end wall longitudinally aligned with said axis, with the support plate having a first side and an opposed second side, and a central slot directed through the support plate through said first side, with a first row of first referenced indicia directed along a slot first side of the support plate first side, with a row of second referenced indicia directed along a slot second side of said support plate first side, with the support plate having a support plate free end, with the free end having a fixed jaw orthogonally mounted to the support plate extending from the support plate second side, and
   a track directed through the support plate, with a slide plate slidably received within the track, and the slide plate having a movable jaw fixedly and orthogonally mounted to the slide plate, with the movable jaw arranged in a facing parallel relationship relative to the fixed jaw,
   the slide plate includes an indicator lug mounted to a slide plate first end oriented between the first referenced indicia and the second referenced indicia, and a slide plate boss mounted to the slide plate adjacent to the slide plate second end permitting manual displacement of the slide plate, with the slide plate boss projecting beyond the support plate first side.

2. A device as set forth in claim 1 including a spring plate engaged by said slide plate within the track.

3. A device as set forth in claim 2 including a magnification lens fixedly mounted to the support plate extending over said first referenced indicia and said second referenced indicia.

4. A device as set forth in claim 3 wherein the handle includes a handle cavity, the handle cavity including a battery member therewithin, and an illumination bulb mounted in electrical communication to said battery member, with a pressure switch projecting through the handle permitting selective illumination of the illumination bulb upon closing of said switch, and a first fiber optic cable and a second fiber optic cable directed into said handle cavity, with the first fiber optic cable having a first cable first end, the second fiber optic cable having a second cable first end, with the first cable first end and the second cable first end arranged in a facing relationship relative to said illumination bulb, and the first fiber optic cable and the second fiber optic cable including respective first cable second end and a second cable second end, with the support plate having a first transparent insert including said first referenced indicia, and a second transparent insert including said second referenced indicia, with the first transparent insert and the second transparent insert arranged in a parallel relationship, with the first cable second end arranged in contiguous adjacency to said first transparent insert, and the second cable second end positioned in contiguous adjacency to said second transparent insert for effecting illumination of said first transparent insert and said second transparent insert upon illumination of said illumination bulb.

* * * * *